United States Patent Office 3,705,972
Patented Dec. 12, 1972

3,705,972
PIPPED PIPES AND MANUFACTURING METHOD
FOR SAID PIPPED PIPES
Benito Luigi Trojani, Via Cortivallo 32, Lugano, Italy
Filed Nov. 8, 1971, Ser. No. 196,451
Claims priority, application Italy, Oct. 7, 1971,
29,607/71
Int. Cl. B23k 9/20
U.S. Cl. 219—107　　　　　　　　　　　　2 Claims

ABSTRACT OF THE DISCLOSURE

A manufacturing method for pipped pipes, characterized in that it is provided at its outer surface with a series of pips, showing an oval or rectangular or prolonged sectional shape, said pips being further disposed so that the larger sides or axes thereof are orthogonal relative to those of the adjacent pips.

---

This invention relates to a novel manufacturing method for making pipped pipes and pipped pipes obtained from said manufacturing method.

Pipped pipes are commercially well known and normally used in the heating or cooling plants or in the chemical or petrochemical industry for either heating or cooling several substances or chemical compounds in fluid or gaseous form, which are conveyed through the aforementioned pipings.

The various pipped pipes as used heretofore are provided with pips having a cylindrical configuration, which are applied by welding to the outer and curved surface of the pipes themselves.

The pips referred to above are made out of metal and serve to increase the surface through which the heat is absorbed.

It is likewise well known that the aforementioned traditional-type pipped pipes do not ensure a high heat exchange between the fluid circulating inside the pipe and the external fluid to which heat is released or from which it absorbs heat.

This disadvantage is due to the fact that, having to apply the pips to the outer surface of the pipes by welding, it is not possible to apply to a determined surface a high number of cylindrical pips just in view of the overall dimension thereof.

It is the object of this invention to manufacture pipped pipes provided with a larger radiating surface than the one of the above-described pipes as manufactured thus far.

Such result may be obtained from the dual and simultaneous arrangement to apply to the extended and outer surface of the pipes pips showing an oval, or rectangular sectional configuration and to dispose the various contiguous pips so that each pip is oriented in such a manner that its larger side or axis is disposed orthogonally or almost orthogonally relative to the larger side or axis of a contiguous pip.

In this manner, it is possible to obtain pipped pipes showing a larger number of pips and consequently a more extended radiating surface with length and diameter the same as the traditional-type pipes.

The manufacturing method according to this invention provides in turn for the execution of the various welding operations by using particular hollow electrodes, showing a cross-shaped sectional configuration, corresponding to the combined outer profile of two 90° mutually inclined pips.

Alternatively, the aforementioned electrodes could show a cavity the inner profile of which will be corresponding to the peripheric profile of the pips to be applied to the pipes.

In such case two parallel or opposed electrodes will be used, disposed so that their inner cavities show their larger sides or axes oriented orthogonally relative to each other.

In such manner, it is possible to continuously apply according to the method of this invention pips having an extended configuration and orthogonally offset relative to each other, without having to rotate the hollow electrode being used for welding the pips.

These and further characteristic features of a functional and constructional nature of the pipped pipe with extended surface according to the present invention will be better understood with the aid of the various figures on the accompanying drawings, in which.

Referring now to the numeral symbols as used in the figures on the accompanying drawings, the manufacturing method according to this invention provides for the application, to the outer surface 1 of a pipe, of a series of pips 2 and 2', showing an oval or rectangular extended sectional shape.

In particular, the pips 2 are welded to the pipe surface 1 so that they are disposed with their larger sides or axes orthogonally relative to those of the adjacent pips 2'.

By such arrangement, it is possible to apply on a determined surface of a pipe 1 a larger number of pips 2 and 2' with a simultaneous larger extended surface than the one obtainable by using pips having a cylindrically shaped traditional configuration.

The manufacturing method according to this invention, providing for the execution of the aforesaid welding operations of special pips, showing an extended sectional configuration and particularly an oval or rectangular sectional shape, also provides for the utilization of particular hollow electrodes 3, showing an inner profile with a "cross-shaped" section, corresponding to the combined external profile of two 90° respectively inclined pips as illustrated by way of example in FIGS. 4, 5, 6, 7, 8 and 9.

Figure 1:
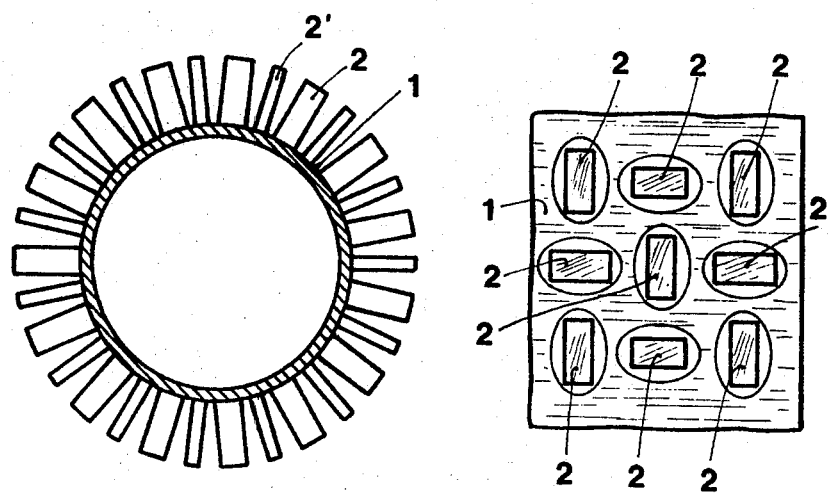
FIG. 1 shows the pipped pipe with extended surface according to this invention in a sectional side view and in a front view in the particular case in which rectangular section shaped pips are applied.
Figure 2:
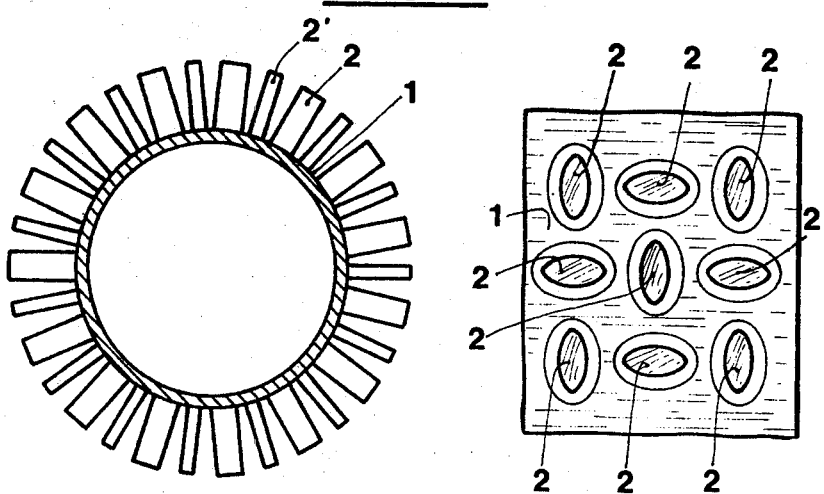
FIG. 2 shows designed by way of example the pipped pipe with extended surface according to this invention in a sectional front view and side view, in the specific case in which oval section shaped pips are welded or however applied thereto.
Figure 3:
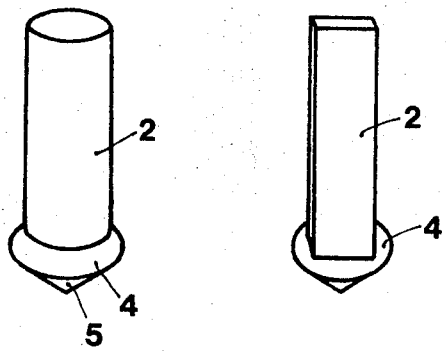
FIG. 3 represents in a perspective side view, still by way of non-limiting example two pips showing an oval and rectangular section.
Figure 4:
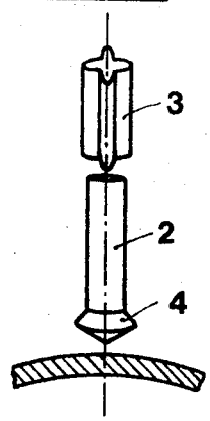
FIG. 4 represents in a perspective schematized and dissociated view the example of an embodiment form of a hollow electrode, utilizable for the welding of an ellipsoidal section shaped pip, together with a pipe portion and a pip.
Figure 5:
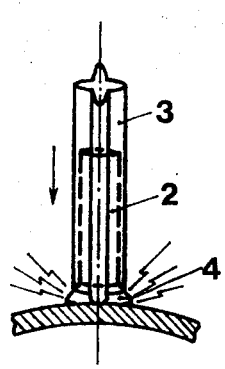
FIG. 5 shows in a perspective side view an electrode of the same type as given in FIG. 4, together with an oval section shaped pip and a pipe portion during the welding operation.
Figure 6:
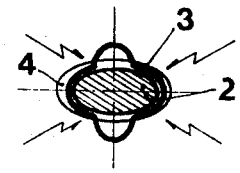
FIG. 6 represents the same organs as given in FIG. 5, but viewed from above, still during the welding operation.
Figure 7:
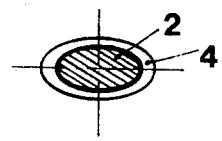
FIG. 7 shows designed, viewed from above, an oval section shaped pip, applied to a pipe portion.
Figure 8:
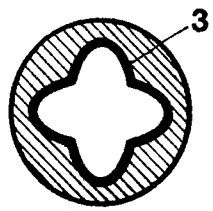
FIGS. 8 and 9 show the configuration of the section of two special hollow electrodes which may effect the welding of oval and respectively rectangular pips, without the need for rotating the electrodes themselves.
Figure 9:
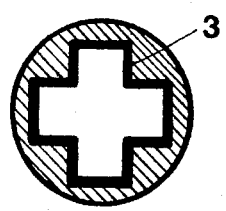
Figure 10:
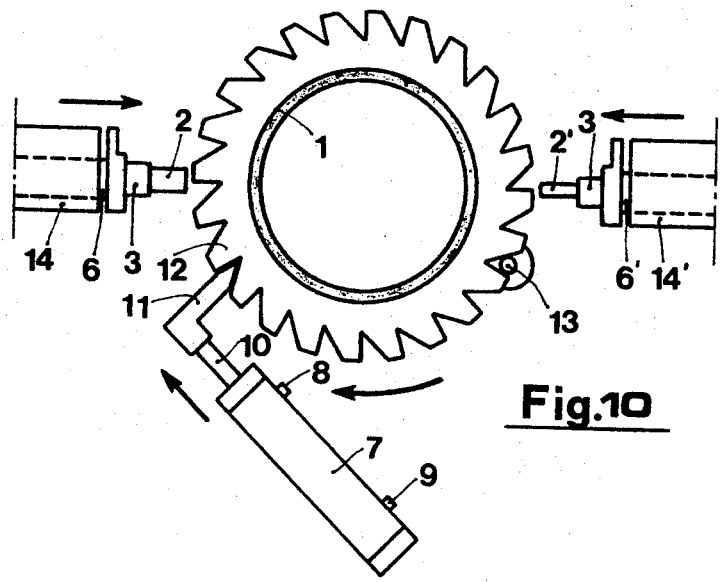
FIGS. 10 and 11 represent by way of example a traditional-type machine, in which two opposed electrodes may be seen, which are applied so that their internal cavities show the larger sides or axes disposed orthogonally relative to each other; in such figures the electrodes are designed in their two limit positions.
Figure 11:
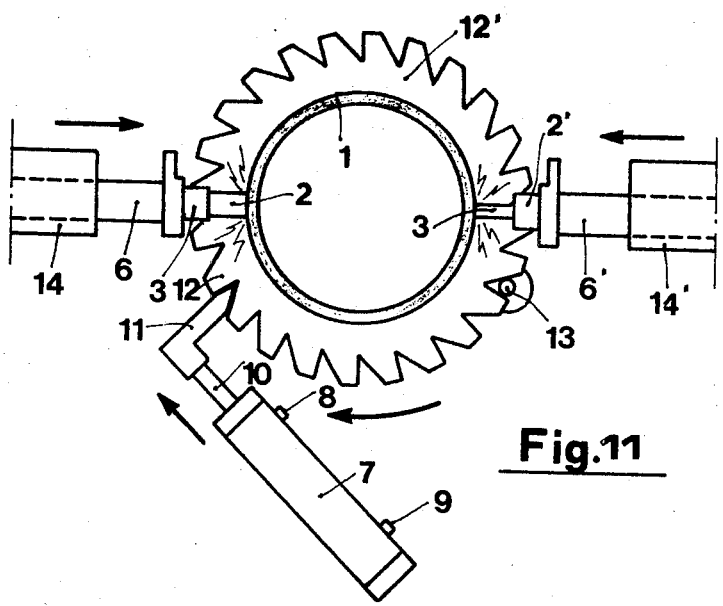

In FIGS. 10 and 11 on the accompanying drawings there is shown another embodiment example of the manufacturing method according to this invention, in the specific case in which opposed electrodes are used, showing cavities of prolonged shape, and it is desired to apply pips of correspondingly prolonged shape, being oriented orthogonally, without the need for rotating the electrodes themselves about their axis during the various welding operations.

In the case as exemplified in FIGS. 10 and 11, the pipe 1 may be fitted at its ends to the spindles of a traditional-type pip welding machine.

The pipe 1 is caused to rotate stripwise by a pneumatic cylinder 7, connected at the orifices 8 and 9 to a compressed air generator.

The rod 10 of the cylinder 7 may describe an alternated rectilinear motion, which is delivered to the tooth 11, made integral with the rod 10.

Said tooth 11 engages with one of the teeth 12 of a gear 12', made integral with one of the spindles supporting the pipe 1 to be pipped.

The same traditional-type machine is provided with a ratchet 13 having the function to prevent between a feed trip and the subsequent trip of the gear 12' an angular displacement in opposite sense of the pipe 1.

The manufacturing method according to this invention provides for the application to two pneumatic cylinders 6 and 6', mounted on two supports 14 and 14' of two electrodes 3 and 3'.

The latter show the characteristic of including an internal cavity, having a rectangular, oval section and disposed so that their larger sides or axes are orthogonally oriented relative to each other.

Said electrodes 3 and 3' may support and permit the application of the pips 2 with a prolonged sectional shape and disposed so that their larger sides or axes orthogonally oriented relative to those of the analogous adjacent pips 2', all this without the need for rotating the electrodes 3 about the axis thereof.

It should be noted here that the electrode 3 during the welding operations is pressed against the collar 4 of the pip 2, terminating with the taper 5, which is in turn introduced into the longitudinal cavity of said electrode 3.

The manufacturing method of the improved pipped pipe with extended surface according to this invention and the pipped pipe obtained from said manufacturing method have been formerly described and illustrated by way of non-limiting example.

From the foregoing it will be understood that several changes and modifications may be introduced therein without departing from the very spirit and scope of this invention.

I claim:

1. A manufacturing method for pipped pipes, characterized in that it provides for the application, to the outer surface of a pipe, by welding, of a series of pips, showing an oval or rectangular sectional shape and disposed so that the larger sides or axes thereof are orthogonal relative to those of the adjacent pips, said pips being further applied by using particular hollow electrodes, showing a profile with a "cross-shaped" section corresponding to the combined external profile of two 90° respectively inclined pips, said hollow electrodes being susceptible of showing an internal cavity with an extended section, corresponding to the external section of the pips, said electrodes being disposed in parallel or opposite way relative to each other and disposed so that their cavities show section with the larger sides or axes being oriented orthogonally.

2. Improved pipped pipe obtained according to the manufacturing method as defined in claim 1, characterized in that it is provided at its outer surface with a series of pips, showing an oval or rectangular sectional shape, said pips being further disposed so that the larger sides or axes thereof are orthogonal relative to those of the adjacent pips.

References Cited

UNITED STATES PATENTS

| | | | |
|---|---|---|---|
| 3,505,121 | 4/1970 | Bougavan | 219—107 X |
| 1,929,444 | 10/1933 | Murray et al. | 219—107 X |
| 2,566,318 | 9/1951 | Dalin et al. | 219—107 |
| 1,821,434 | 9/1931 | Hamilton | 165—177 |

JOSEPH V. TRUHE, Primary Examiner

B. A. REYNOLDS, Assistant Examiner

U.S. Cl. X.R.

165—77; 219—98